United States Patent [19]

Stocker

[11] 4,226,324

[45] Oct. 7, 1980

[54] ARTICLE TURNOVER ASSEMBLY

[75] Inventor: Lester H. Stocker, Phillipsburg, N.J.

[73] Assignee: Bell & Howell Company, Phillipsburg, N.J.

[21] Appl. No.: 904,120

[22] Filed: May 8, 1978

[51] Int. Cl.[2] .............................................. B65G 47/24

[52] U.S. Cl. .................................... 198/405; 198/417; 414/758

[58] Field of Search ............... 198/405, 404, 626, 627, 198/628, 806, 808, 836, 417; 271/186, 65; 214/1 Q; 414/757, 758

[56] References Cited

U.S. PATENT DOCUMENTS

| | | | |
|---|---|---|---|
| 1,028,739 | 6/1912 | Kibat | 198/628 X |
| 2,725,972 | 12/1955 | Howdle | 198/628 X |
| 2,947,406 | 8/1960 | Hazelton | 198/405 |
| 3,280,995 | 10/1966 | Barkley | 198/405 |
| 3,726,388 | 4/1973 | Petrovas et al. | 198/405 |
| 3,729,189 | 4/1973 | Watson | 271/65 X |
| 3,756,586 | 9/1973 | Craft | 198/417 X |
| 3,838,771 | 10/1974 | Whiteford | 198/405 X |
| 3,951,257 | 4/1976 | Storace et al. | 198/628 |

*Primary Examiner*—Robert B. Reeves
*Assistant Examiner*—Douglas D. Watts
*Attorney, Agent, or Firm*—Griffin, Branigan & Butler

[57] ABSTRACT

An article turnover assembly (16) for transporting flat envelopes and the like while turning them over 180 degrees includes upper and lower crowned entrance and exit pulleys (22 and 24; 52 and 54) having two flexible endless belts (18 and 20) extending between the lower entrance pulley and the upper exit pulley and the upper entrance pulley and the lower exit pulley. The belts are twisted 180 degrees between the entrance and exit pulleys with each having at least one span contiguous to a corresponding span of the other. Registration of envelopes (10) is established at the entrance and is maintained by a horizontal flat registration plate (60) located about half of the travel distance between the entrance and exit pulleys. In addition, two opposed idler wheels (64 and 66) bias the spans together above the horizontal flat registration plate at about 3/5 of the travel distance through the assembly. Contoured stationary plows (84 and 86) are included at a downstream end of the contiguous belt spans to assist in turning the envelopes over.

7 Claims, 9 Drawing Figures

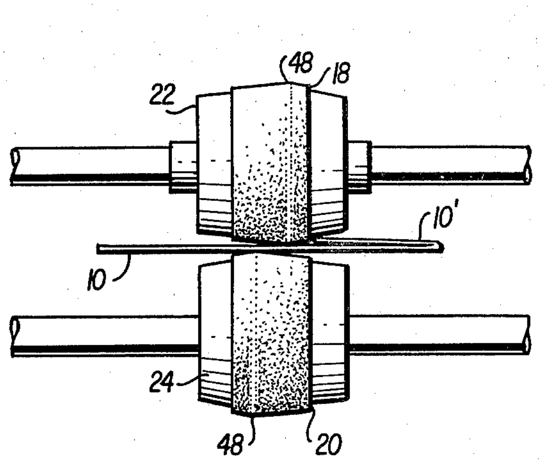
FIG. 3a
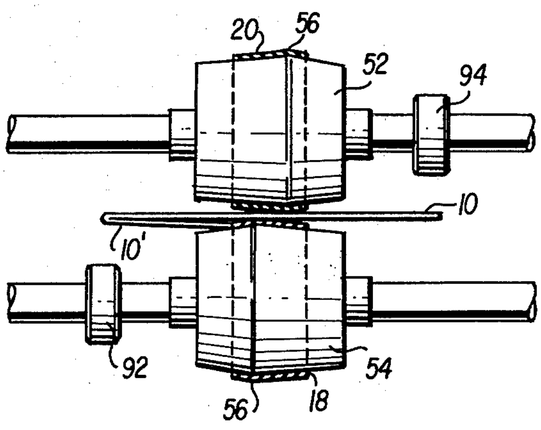
FIG. 3b
FIG. 5
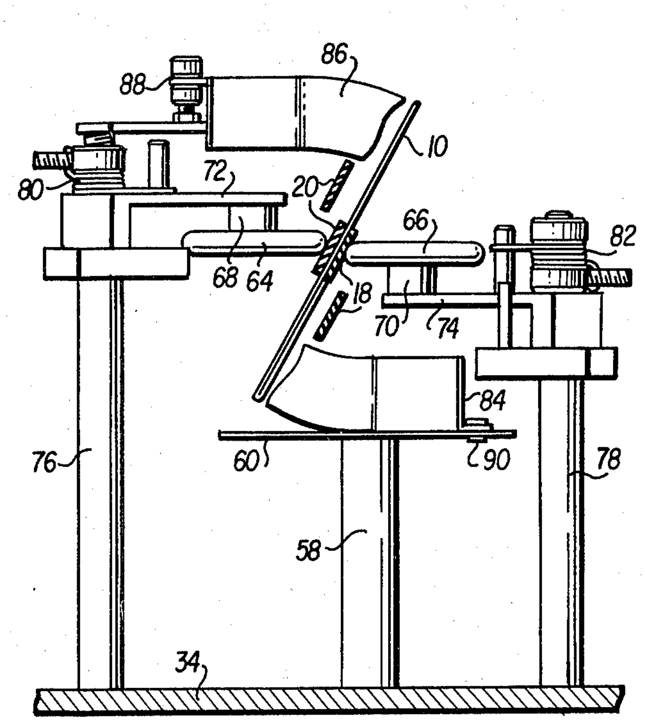
FIG. 4
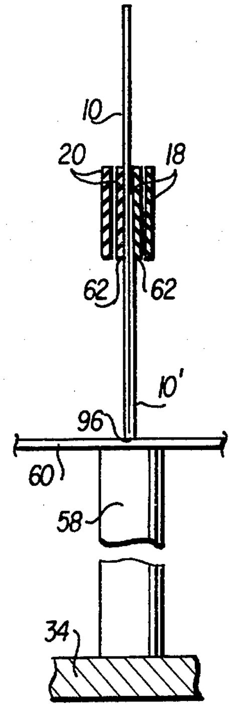
FIG. 6
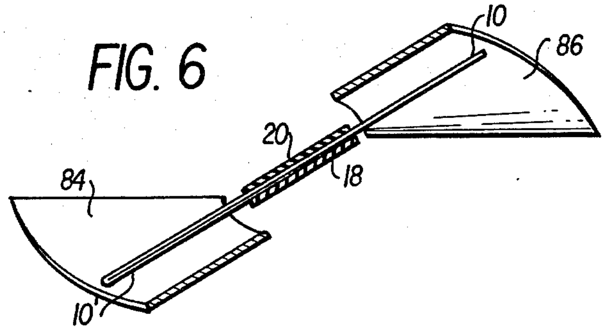

ARTICLE TURNOVER ASSEMBLY

BACKGROUND OF THE INVENTION

This invention relates to mass-mailing equipment and more particularly to an envelope turnover device having utility, for example, in mechanisms wherein filled carrier envelopes are transported from an inverted position on an automatic inserting machine to a face-up position on a postage affixing machine.

In most inserting equipment in use today carrier envelopes are positioned with their faces down, flaps extended, and backs up, during insertion by an automatic inserting machine. As the envelopes leave the inserting machine, the flaps are moistened and sealed shut to the backs of the envelopes. At this point, the envelopes are still in face-down positions. Stamp affixing and postage metering machines, however, are normally designed to affix postage to the carrier envelopes when they are passed therethrough face-up with the top edges of the envelopes registered on a desired plane. Hence, it is an object of this invention to provide a device for turning an envelope over with its upper edge registered and front face positioned to accept postage from a standard postage machine of the type normally in use today.

A technique used by most mass mailers today is to gather the envelopes as they come out in the inserter machine; hand carry them to a receiving part of the postage machine; turn them over to be face-up by hand; and feed them into the postage machine. However, there are mechanical means of transporting the envelopes from the inserter to the postage machine and inverting them in route, but they are often complex, bulky, or difficult to maintain. Some such automatic envelope inverting devices use spiraled, or twisted, belts to hold and invert the envelopes, but a difficulty with these devices is that envelopes sometimes slip from between the belts when the device is operated at the high speeds necessary to accept outputs from some mailing inserters. An object of the invention about to be described, therefore, is to provide a device that can turn envelopes over at high speeds without the envelopes falling out or becoming misaligned.

Examples of prior-art, twisted belt turnover devices are found in U.S. Pat. Nos.: 2,947,406 to Hazelton; 3,280,995 to Barkley; 3,729,189 to Watson; 3,726,388 to Petrovas et al; and 3,838,771 to Whiteford.

Some of the current art inverting apparatus are long and take up a lot of floor space. They also require the presetting of guide troughs at entrances and exit apertures for different size articles or envelopes. A further object of this invention therefore is to provide a turnover device which requires a relatively short travel distance and which does not require the setting of guide troughs for different size articles.

It is also an object of this invention to provide a turnover device which is uncomplicated in structure but yet which maintains articles in proper registration for receiving postage when it turns them over.

SUMMARY

According to principles of this invention an article turnover assembly transports articles between two twisted endless belts which are mounted on upper and lower entrance and exit pulleys. The belt mounted on the upper entrance pulley is twisted 180 degrees and is mounted on the lower exit pulley. The other endless belt is mounted on the lower entrance pulley, is also twisted 180 degrees, and is mounted on the upper exit pulley. One of the entrance pulleys is driven which drives both belts and the other pulleys.

The entrance and exit pulleys are crowned with the crowns being offset slightly to one side of center of the pulleys. The crowns of the two upper pulleys are offset to the right and the crowns of the two lower pulleys are offset to the left. The belts tend to center themselves toward the high points of the crowns, but are narrow enough to leave edges of transported envelopes free for registration. A registration wall may be positioned beside the entrance pulleys to register upper edges of the envelopes.

A fixed horizontal registration plate is positioned below the belts between the entrance and exit pulleys. This plate contacts edges of the envelopes to register the envelopes and to insure that the envelopes do not fall from between the belts when the envelopes are rotated to a vertical position by the belts. In addition, idler wheels biased against the contiguous belts tend to hold the belts together on the envelope to help maintain alignment and to prevent spillage of the envelope.

Finally, contoured plows are mounted at the downstream end of travel between the entrance and exit pulleys to aid in twisting the envelopes through the last 90 degrees of rotation to a horizontal face-up position as they exit from the turnover assembly.

The upper entrance and exit pulleys are biased toward their respective lower pulleys by springs such that a gap between pulleys will accept variable thickness envelopes.

BRIEF DESCRIPTION OF THE DRAWINGS

The foregoing and other objects, features, and advantages of the invention will be apparent from the following more specific description of preferred embodiments as illustrated in the accompanying drawings in which like referenced characters refer to the same parts throughout the various views. The drawings are not necessarily to scale, emphasis instead being placed upon illustrating principles of the invention.

FIG. 3*a* is a partial vertical sectional view viewed from the entrance on line 3*a*—3*a* in FIG. 1;

FIG. 3*b* is a partial vertical sectional view as viewed from the entrance on line 3*b*—3*b* in FIG. 1;

FIG. 4 is a fragmented cross-sectional view of a structure of the invention taken along line 4—4 in FIG. 1 with some parts not shown for the purpose of simplification.

FIG. 5 is a staggered fragmented cross-sectional view of a structure of the invention taken along line 5—5 of FIG. 1;

FIG. 6 is a fragmented cross-sectional view of a structure of the invention taken along line 6—6 of FIG. 1;

DESCRIPTION OF PREFERRED EMBODIMENTS

Figure 1:
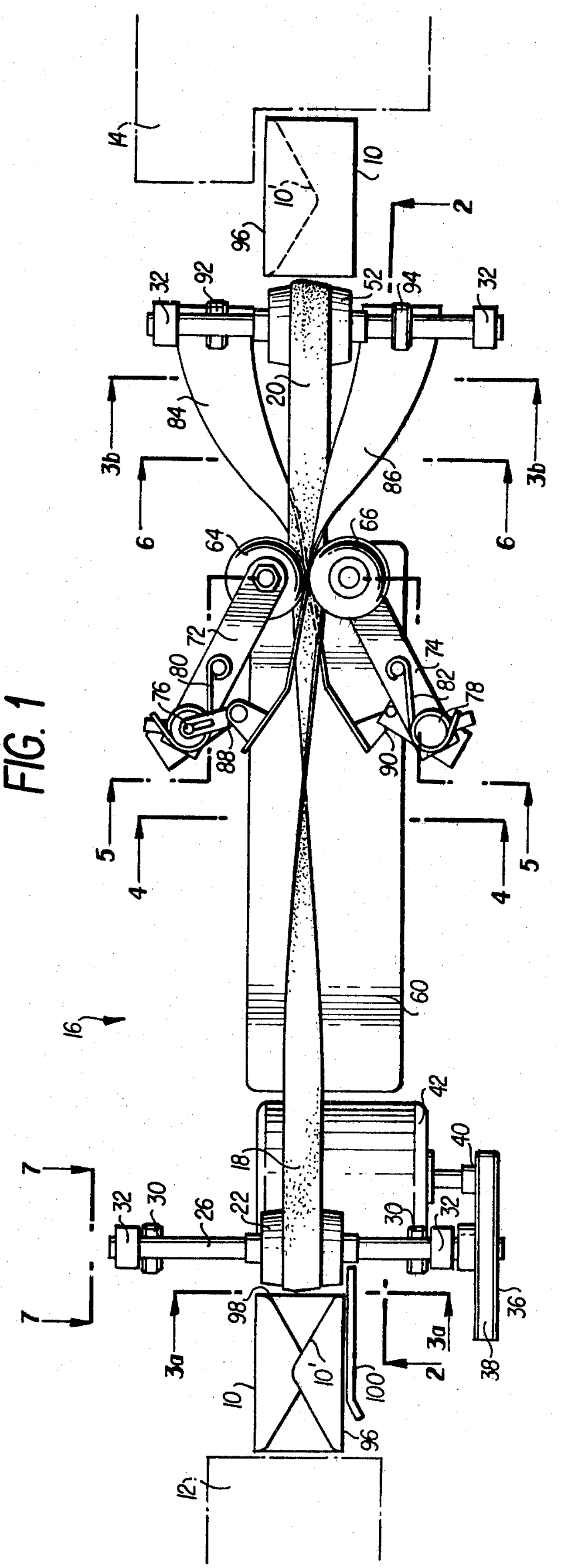
FIG. 1 is a plan view of an article turnover assembly according to principles of this invention mounted between a mass mailing inserting machine and a postage affixing machine of the live stamp or postage meter type.
Figure 2:
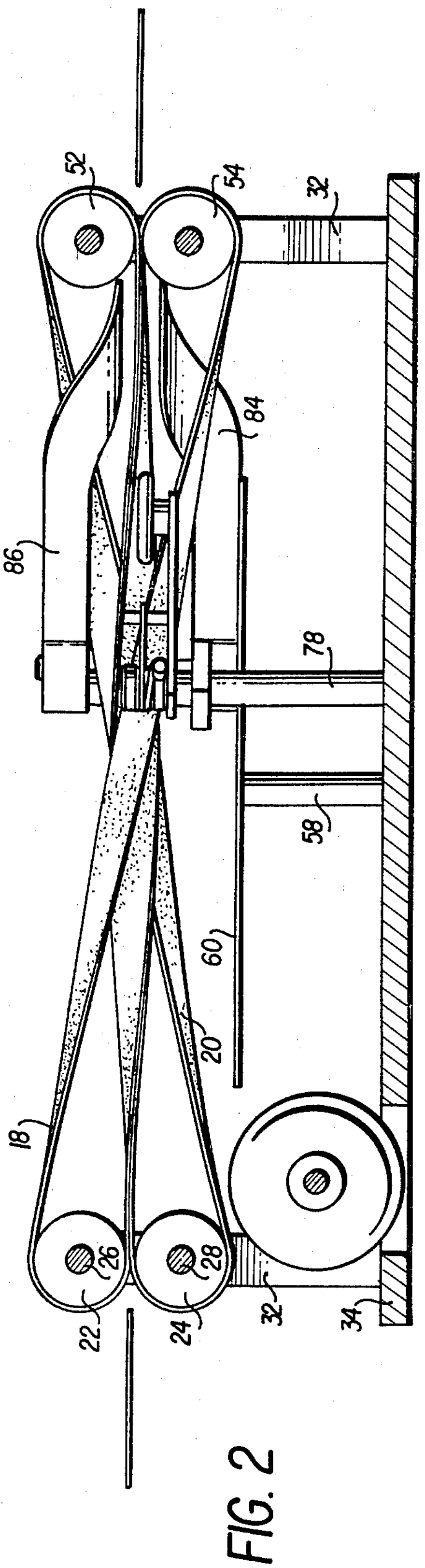
FIG. 2 is a partial cross-sectional view of the turnover assembly taken along the line 2—2 in FIG. 1.

With reference to FIGS. 1 and 2, a filled carrier envelope 10 is face down with its flap 10' up. The envelope is first transported from an inserter 12, then turned over 180 degrees, and finally delivered to a postage affixing machine 14 face up with its flap 10' down.

The envelope 10 enters a turnover assembly 16 including two flexible endless belts 18 and 20 which are mounted on entrance roller pulleys 22 and 24. The upper entrance roller pulley 22 rotates on an upper shaft 26 positioned parallel to and vertically above a lower shaft 28. Upper shaft 26 is mounted in frame brackets 32 which, in turn, are fastened to a base plate 34. The lower entrance pulley 24 is fixed to the lower shaft 28 which rotates in journal bearings 30 mounted to the frame brackets 32.

The lower shaft 28 has a large diameter 'V' belt drive pulley 36 fastened to its end outside one of the frame brackets 32. The belt drive pulley 36 is driven by an endless 'V' belt 38 from a small diameter 'V' belt drive pulley 40 fastened to the end of an electric motor 42. The second endless belt 20 is driven by the lower entrance roller pulley 24 which is fastened to the lower shaft 28, which is, in turn, fastened to drive pulley 36.

Figure 7:
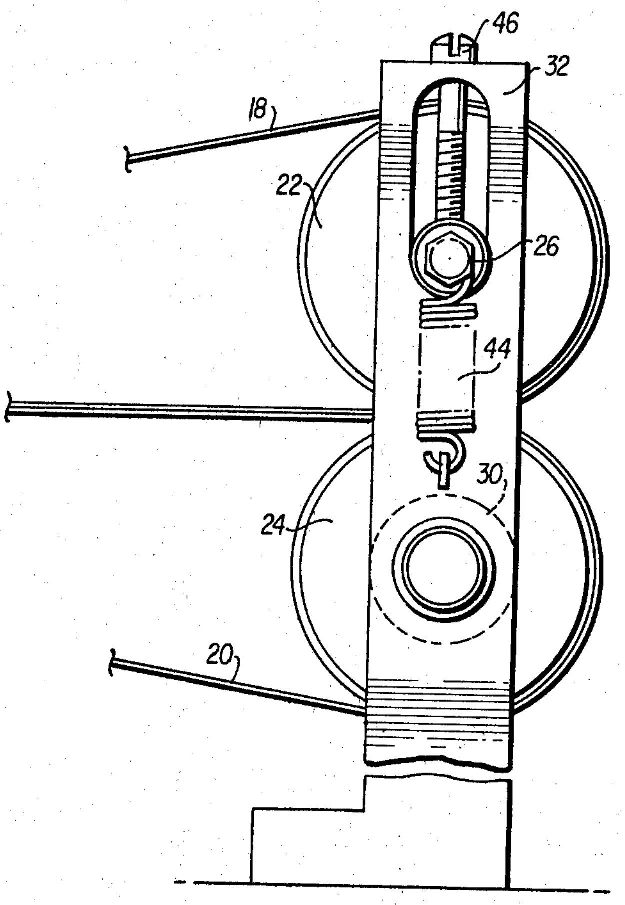
FIG. 7 is a simplified cross-sectional view of a structure of the invention taken along line 7—7 of FIG. 1.

The first endless belt 18 and its upper roller pulley 22 are driven by friction between the first and second endless belts 18 and 20 where they are in contact. In this regard, referring to FIG. 7, it can be seen that the upper roller pulley 22 and its endless belt 18 are biased toward the lower roller pulley 24 and its endless belt 20 by tension springs 44 which are fastened to the ends of the upper shaft 26 and to frame brackets 32 just above the lower journal bearings 30.

Threaded screws 46 pass freely through the top of frame brackets 32 and are threaded into the ends of the upper shaft 26 to adjust the gap between the upper and lower roller pulleys 22 and 24 by raising or lowering the upper shaft 26 on which the upper roller pulley 22 rotates.

Referring to FIG. 3*a*, the upper and lower entrance roller pulleys 22 and 24 are crowned with the high point 48 of the upper roller pulley's crown being offset to the right side of the pulley and the lower roller pulley's crown being offset to the left side of the pulley, whereby the first and second belts 18 and 20 are centered on the high points 48. The offset crowns tend to compensate for counter twisting forces acting on the twisted belts.

At the exit to the turnover assembly 16, upper and lower exit roller pulleys 52 and 54, with their shafts, journal bearings, and tension springs, are mounted on frame brackets 32 attached to the base plate 34 in the same manner as the upper and lower entrance roller pulleys 22 and 24. As can be seen in FIG. 3*b*, the upper roller pulley 52 is crowned with the high point 56 thereof being offset to the right side of the roller pulley 52, and the lower roller pulley 54 being crowned with high point 56 offset to the left side of the roller pulley 54, whereby the flexible belts 18 and 20 are centered on the high point 56.

From FIG. 2, it can be seen that the second endless belt 20, in addition to being driven by the lower entrance roller pulley 24 at the entrance, is twisted 180 degrees so that it rides on the upper roller pulley 52 at the exit. At the same time, the first endless belt 18 rides on the upper entrance roller pulley 22 and then is twisted 180 degrees so that it rides on the lower exit roller pulley 54.

At about half of the distance between the entrance and the exit pulleys, conveyed carrier envelopes 10 are rotated to the vertical position as will be further described below. At this point the envelopes 10 are kept from falling from between the belts by a horizontal plate 60 fastened below the lower edges 62 of the two contiguous belts in their vertical positions. (See FIG. 4). The registration distance from the edges 62 of the belts to the horizontal plate 60 is maitained by a vertical post 58 which supports the horizontal plate 60 from the base plate 34.

At about 3/5 of the distance between the entrance and exit pulleys, a pair of horizontally opposed idler wheels 64 and 66 which are held in spring tension against the first and second endless belts 18 and 20 assist in keeping the envelopes 10 from falling from between the belts (See FIG. 5). The idler wheels 64 and 66 are mounted on vertical shafts 68 and 70 fastened to radial arms 72 and 74 which are pivoted from vertical frame posts 76 and 78 mounted on the base plate 34. The idler wheels 64 and 66 are held in pressure against the belts by coiled springs 80 and 82 affixed to the vertical frame posts 76 and 78 and the radial arms 72 and 74.

At about the last 2/5's of the path traveled by envelopes through the turnover assembly, are located turning plows 84 and 86 which assist in turning envelopes to their final horizontal positions. These are depicted in FIGS. 1, 5 and 6.

The two turning plows 84 and 86 are mounted at their front ends to flexible pivot mounts 88 and 90 which are pivotally mounted to the vertical frame posts 76 and 78. At their exit ends, the plows are supported by bearing mounts 92 and 94 which ride on the shafts of exit roller pulleys 52 and 54. Thus, the exit ends of the plows 84 and 86 are supported by these shafts.

Figure 8:
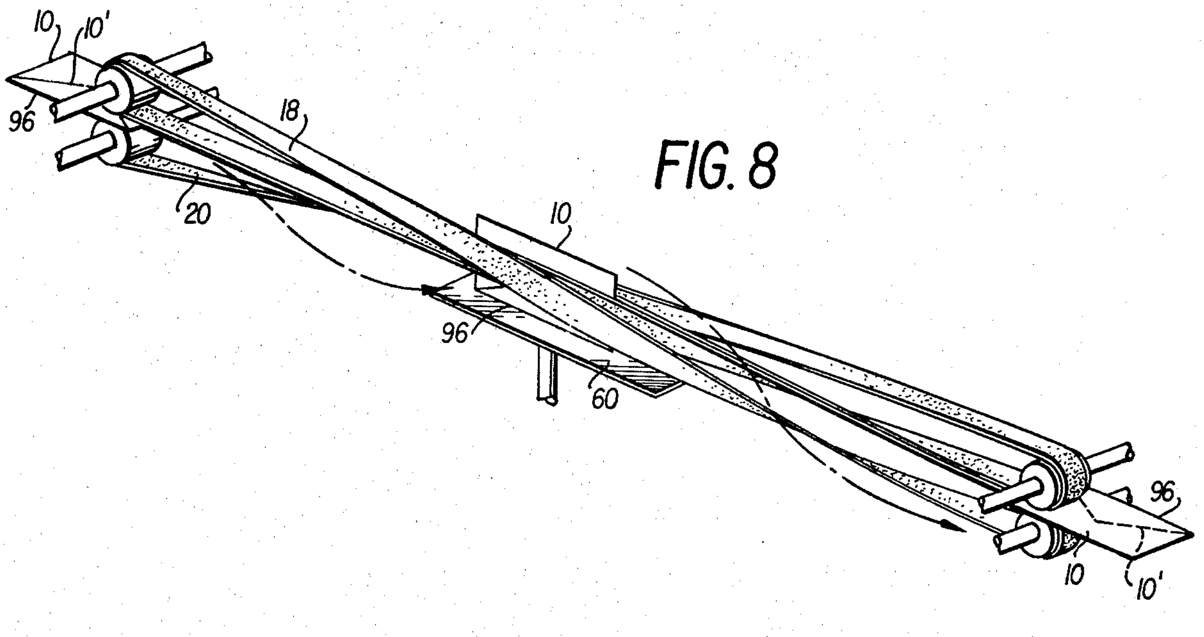
FIG. 8 is a pictorial view illustrating a portion of the turnover device of the invention.

In operation, top edges 96 of envelopes emerging from the inserter 12 may be registered against a registration wall 100 and fed to a nip formed between the upper and lower entrance roller pulleys 22 and 24 and their respective first and second endless belts 18 and 20. The offset crown roller pulleys 22 and 24 center the first and second endless belts 18 and 20 over the high points 48 and keep the belts from being thrown off the pulleys in the course of being twisted. The envelopes are held between the first and second endless belts which rotate the envelopes to the vertical position as is shown in FIGS. 4 and 8. In this position, the envelopes are urged downwardly by gravity and centrifugal motion and thereby tend to slip from between the belts 18 and 20. However, the horizontal plate 60 which is located below the envelopes 10 at this point, and which is adjusted to the proper height, maintains registration of the top edge 96 of the envelopes 10 by contacting them and prevents them from falling askew. In this regard, the top edges 96 of the envelopes are free of the belts for contacting the horizontal plate 60. The offset idler wheels 64 and 66 clamp inwardly on the first and second endless belts 18 and 20 in their contiguous span to hold the envelopes 10 in relatively stable positions.

Slightly downstream, the leading edges 98 of the envelopes contact the contoured turning plows 84 and 86 which aid in rotating of the envelopes 10. Finally, the envelopes emerge at the upper and lower exit roller pulleys 52 and 54 in the correct position to be fed to the postage affixing machine 14 with the top edges 96 registered.

It should be noted that the envelopes top edges 96 may be registered against the registration wall 100 while they are being fed to the turnover assembly and that this registration is maintained by the horizontal plate 60. Thus, when the envelopes emerge from the turnover assembly, their top edges 96 are still registered on a specific line (although on the opposite side of the travel path from the original registration wall) no matter what the sizes of the envelopes might be. That is, the positions of the registration lines do not change with the sizes of the envelopes being processed, thus no adjustment is necessary for processing different size envelopes.

As illustrated in the preceding description, the envelope or article turnover assembly is a very simple arrangement requiring little space, relatively little maintenance, and relatively little attention for proper operation. The assembly efficiently accepts filled, registered envelopes between its belts; moves the envelopes securely in this registered position as it turns them over 180 degrees without letting them fall from between the belts. The assembly thereby transports envelopes longitudinally from a mass mailing inserting machine to a stamp affixing or postage meter type machine while turning the envelopes over 180 degrees from a face-down position to a face-up position.

It has been found that the article turnover assembly described herein accomplishes turnover of standard size envelopes in about 24 inches of longitudinal travel. Such rapid turnover is accomplished in part by means of the turning plows 84 and 86 which aid the endless belts and which allow the endless belts to run at much higher speeds than was normally allowed in the prior art.

In addition to accomplishing these results at fast speeds and over a short distance, various size envelopes are delivered with their top edges accurately registered to a desired position needed for introduction into a postage meter.

In addition, the pressure system of the tension springs urges the entrance and exit pulleys together to allow use of the turnover assembly of this invention with variable thickness envelopes and the like.

Although this invention has been described with reference to a preferred embodiment, other embodiments not specifically described herein could also be used within the scope of the invention such as a single registration wall at the entrance. In addition, supporting structure that is used in the presently working embodiment of this invention is not described herein for the sake of simplicity. For example, there are vertical side walls and end walls attached to the base plate 34 as well as other elements such as a top cover, hinges, etc.

The embodiments of the invention in which an exclusive property or privilege is claimed are defined as follows:

1. An article turnover assembly for transporting flat articles such as envelopes or documents from an entrance position to an exit position while turning the articles, said assembly comprising:

two crowned entrance pulleys, a first of said entrance pulleys mounted above the second at said entrance position, each entrance pulley having its crown offset to the opposite side as the other;

two crowned exit pulleys, a first of said exit pulleys mounted above the second at said exit position, each exit pulley having its crown offset to the opposite side as the other;

two flexible endless belts for transporting articles longitudinally between them as said belts move contiguously from the entrance position to the exit position, said flexible endless belts respectively extending from said first entrance pulley to said second exit pulley and from said second entrance pulley to said first exit pulley; said belts being twisted 180° between said entrance and exit pulleys and each having at least one span contiguous to a corresponding span of the other, said spans traveling from said entrance pulleys to said exit pulleys; and, a means for driving at least one of said pulleys so that the contiguous belt spans move together in the same direction from said entrance position to said exit position at the same rate of speed.

2. The assembly as in claim 1, said assembly further comprising a horizontal, flat registration plate beneath the belts between said entrance and exit pulleys for contacting an edge of articles being transported by said flexible endless belts.

3. An assembly as in claim 1, said assembly comprising a control means positioned between said entrance and exit pulleys to keep the articles from spilling or falling askew from said belt spans when the belt spans are approximately parallel to a vertical plane.

4. An assembly as in claim 3, wherein said control means comprises at least two opposed idler wheels and a biasing means for biasing said opposed idler wheels against opposite sides of the belt spans to assist in preventing spillage of articles from between the belts.

5. An assembly as in claim 4, wherein said control means comprises a horizontal flat registration plate positioned beneath said belts to assist in preventing spillage of the article from between the belts.

6. An assembly as in claim 1, 3, 4, or 5, said assembly comprising a stationary contoured plow means for contacting said articles to assist in twisting said articles as said articles are transported by said belt spans.

7. An assembly as in claim 1, wherein said entrance and exit pulley pairs are respectively biased toward one another, but are free to separate so that the assembly can automatically accept articles of varying thicknesses without a need for adjustment.

* * * * *